(12) United States Patent
Reinhard

(10) Patent No.: US 7,090,223 B2
(45) Date of Patent: Aug. 15, 2006

(54) SHAFT SEALING MODULE FOR SEALING VACUUM CHAMBERS

(75) Inventor: Helmut Reinhard, Frankfurt (DE)

(73) Assignee: Reinhard Feinmechanik GmbH (DE)

( * ) Notice: Subject to any disclaimer, the term of this patent is extended or adjusted under 35 U.S.C. 154(b) by 0 days.

(21) Appl. No.: 10/836,478

(22) Filed: Apr. 30, 2004

(65) Prior Publication Data

US 2005/0001384 A1    Jan. 6, 2005

(30) Foreign Application Priority Data

May 3, 2003    (DE) ................. 103 19 821

(51) Int. Cl.
*F16J 15/32* (2006.01)

(52) U.S. Cl. .............. 277/551; 277/552; 277/558; 277/571; 277/913

(58) Field of Classification Search ........... 277/422, 277/527, 551, 552, 558, 571, 913; 384/37, 384/54, 106, 535, 581, 569

See application file for complete search history.

(56) References Cited

U.S. PATENT DOCUMENTS

| | | | | |
|---|---|---|---|---|
| 4,136,887 A | * | 1/1979 | Wentworth, Jr. ........... 277/374 |
| 4,448,426 A | * | 5/1984 | Jackowski et al. .......... 277/353 |
| 4,596,394 A | * | 6/1986 | Schmitt ....................... 277/353 |
| 5,117,066 A | * | 5/1992 | Balsells ................. 174/35 GC |
| 5,375,933 A | * | 12/1994 | Mizutani et al. ............ 384/476 |
| 5,709,544 A | * | 1/1998 | Wurtz ......................... 432/242 |
| 6,296,255 B1 | * | 10/2001 | Hashimoto .................. 277/558 |
| 2002/0047242 A1 | * | 4/2002 | Watanabe et al. ........... 277/553 |

* cited by examiner

Primary Examiner—Vishal Patel
(74) Attorney, Agent, or Firm—McAndrews Held & Malloy, Ltd.

(57) ABSTRACT

A shaft sealing module is proposed for sealing a shaft which extends driving rotationally from a normal pressure chamber into a high vacuum chamber. It is essential for the shaft sealing module according to the invention that the dynamic seal of the shaft takes place not on the shaft itself but on a bushing mounted rotatably in a housing through which is guided a shaft and which is held on the shaft in friction connection, statically sealed, by elastic rings so that the bushing rotates with the shaft. The dynamic seal between the bushing and the housing is achieved by several radial shaft sealing rings which are preferably arranged so that between them is provided a prevacuum chamber with intermediate evacuation so that a two-stage dynamic seal is provided, where the prevacuum acts on the static seal between the bushing and the shaft in the sense of a gas penetration barrier towards the high vacuum chamber.

9 Claims, 3 Drawing Sheets

SHAFT SEALING MODULE FOR SEALING VACUUM CHAMBERS

RELATED APPLICATIONS

[Not Applicable]

BACKGROUND OF THE INVENTION

The present invention relates generally to a shaft sealing module for sealing a shaft which extends, driving rotationally, from a normal pressure chamber into a high vacuum chamber. As an example, manufacturing processes in the semi-conductor field largely take place under vacuum, in particular coating processes. During these processes the substrates to be coated must be moved. As the drive elements for these are usually mounted on the atmospheric or normal pressure side of these machines or devices, the substrates can only be moved if rotational movements are transmitted into the evacuated system via a sealed shaft.

These processes often take place at very high vacuum pressures, often of the order of $10^{-8}$ mbar. In order, however, to be able to work with small vacuum pumps and avoid the penetration of gases ($O_2$, $N_2$, $CO_2$) harmful to these processes into the high vacuum chamber from the normal pressure chamber via the shaft arrangement, very high requirements are imposed on the shaft seal.

In such shaft seals it is known to use a "magnetic fluid" comprising a suspension of ferritic nanoparticles in an oil with high vapor pressure which is maintained in a gap about the rotating shaft via a particular arrangement of magnets and pole shoes. However, many coating processes involve the use of high frequency electric field. In such instances, the use of "magnetic fluids" is not possible because the magnets of the shaft seals makes it difficult or impossible to control the high frequency currents flowing on the surfaces. Additionally, the magnetic fluid shaft seals can be damaged by the flowing currents and hence become ineffective.

BRIEF SUMMARY OF THE INVENTION

Certain aspects of embodiments of the present invention relate to a shaft sealing module which operates without "magnetic fluids", ensures a reliable seal over long periods at the shaft transition between the normal pressure chamber and the high vacuum chamber, and has a comparatively simple construction.

According to certain aspects of the present invention, a shaft sealing module is provided for sealing a shaft which extends driving rotationally from a normal pressure chamber into a high vacuum chamber. A bushing is rotatably mounted within a housing through which bushing the shaft can be passed concentrically. The bushing is held in friction connection statically sealed on the shaft by a multiplicity of elastic rings and is dynamically sealed against the housing by radial shaft sealing rings with elastomer sealing lips pressed by coil tension springs on the bushing.

Certain aspects of the invention relate to a shaft sealing module which can be handled and produced separately from the shaft and the shaft passage through the container wall or similar separating the normal pressure chamber from the high vacuum chamber. The module can be pushed onto the corresponding shaft and attached tightly sealing to a container wall or similar feature.

According to certain aspects of the present invention, a bushing is rotatably mounted within a housing. A shaft can be passed concentrically through the bushing. The bushing is held in friction connection statically sealed on the shaft via a multiplicity of elastic rings and is sealed dynamically against the housing by radial shaft sealing rings with elastomer sealing lips pressed by coil tension springs against the bushing. This arrangement advantageously allows a prevacuum chamber to be created for intermediate evacuation if the shaft sealing module has several radial shaft sealing rings. This results in a two-stage dynamic seal and also allows the prevacuum chamber to be connected with the chambers formed between the elastic rings, the shaft and the bushing. As a result, a single intermediate evacuation can be used to increase the sealing effect of both the dynamic and the static seal.

The elastic rings, which may be formed as O-rings, are suitably held in ring grooves of the bushing. The contact pressure with which the shaft is held in friction connection with the bushing can be determined via the choice of groove depth, groove width, and/or O-ring dimensions. The necessary amount of contact force depends on the friction moment exerted by the radial shaft sealing rings under the contact pressure of the sealing lips on the bushing and operating conditions, plus the rolling friction of the roller bearings via which the bushing is rotatably mounted in the housing. The roller bearings, which may for example be two deep groove roller bearings separated by an intermediate ring, are arranged adjacent to the normal pressure chamber and not therefore exposed to vacuum pressure.

To prevent HF arcing between the fixed part and the moving parts of the shaft sealing module, the bushing and shaft may be electrically isolated from the housing. For example, the outer roller bearing rings can sit in an insulating bushing supported on the housing. This excludes HF transitions to the roller bearing bodies, where applicable the balls, and destruction of the bearings from HF arcing, The bushing may be connected electrically conductively with the shaft via a metal spring washer sitting in the receiving groove of the bushing. These measures ensure that the bushing has the same electrical potential as the shaft.

According to certain aspects of one embodiment, three radial shaft sealing rings are provided. One of the radial shaft sealing rings is adjacent to the roller bearings and has a sealing lip which faces the normal pressure chamber and has a rear face which rests on a spacer ring forming the prevacuum chamber. The other two radial sealing rings are adjacent to the high vacuum chamber, have rear faces and lie against each other with their rear faces and rest firstly on the spacer ring and secondly on a ring step of a stepped bore of the housing holding the radial shaft sealing rings and the roller bearings. The spacer ring can include radial bores in order to connect the prevacuum chamber with a vacuum pump.

The shaft sealing module may include several sealing rings, so as to provide a two-step dynamic seal by means of a prevacuum chamber with an intermediate evacuation arranged therebetween. The prevacuum chamber may be connected with the cavities between the elastic rings by channels in the bushing. In this regard, the bushing can include a wall in which is provided a collection channel, axially parallel and closed on both sides. The collection channel extends over all of the elastic rings and is connected via radial channels with the cavities between the elastic rings and via a further channel with the prevacuum cluster.

According to certain aspects of one embodiment, the inner roller bearing rings rest firstly on a ring shoulder of the bushing and secondly on a ring nut which can be screwed onto an external thread of the bushing. According to certain other aspects of one embodiment, outer roller bearing rings, with their insulating bushing, rest firstly on a further ring step of the stepped bore of the housing and secondly on a threaded ring of electrically insulating material which can be screwed into an internal thread of the stepped bore. According to certain other aspects of one embodiment, the side of the housing facing the high vacuum chamber has a cylindrical mounting collar concentric with the stepped bore and terminating in a flat face in which is located a receiving groove for a sealing ring to ensure a static seal against a wall delimiting the high vacuum chamber. This results in a centered attachment of the shaft sealing module on a wall limiting the high vacuum chamber and its seal to this wall.

According to another aspect of one embodiment, the housing includes a first atmosphere bore which connects the normal pressure chamber with the stepped bore of the housing in front of the radial shaft sealing ring adjacent to the roller bearings via a degasification groove in the insulating bushing. The first atmosphere bore ensures that atmospheric pressure is present in front of the first radial shaft sealing ring adjacent to the roller bearings. According to another aspect of one embodiment, a second atmosphere bore is provided in the housing to ensure that normal pressure is present in front of the outer elastic ring between the bushing and the shaft. The first and second atmosphere bores also serve as channels for the supply of helium for a leakage test of the shaft sealing module by measurement of the leakage rate.

According to another aspect of one embodiment, the housing includes a plurality of disassembly bores which are axially parallel to the stepped bore and evenly distributed over the periphery, through which the radial shaft sealing rings can be pushed out from the stepped bore. The provision of several dismantling bores allows removal of the radial shaft sealing rings from the housing, for example for maintenance work.

BRIEF DESCRIPTION OF SEVERAL VIEWS OF THE DRAWINGS

Further details of the invention are described below with reference to a preferred embodiment example of the shaft sealing module shown in the drawings.

DETAILED DESCRIPTION OF THE INVENTION

Figure 2:
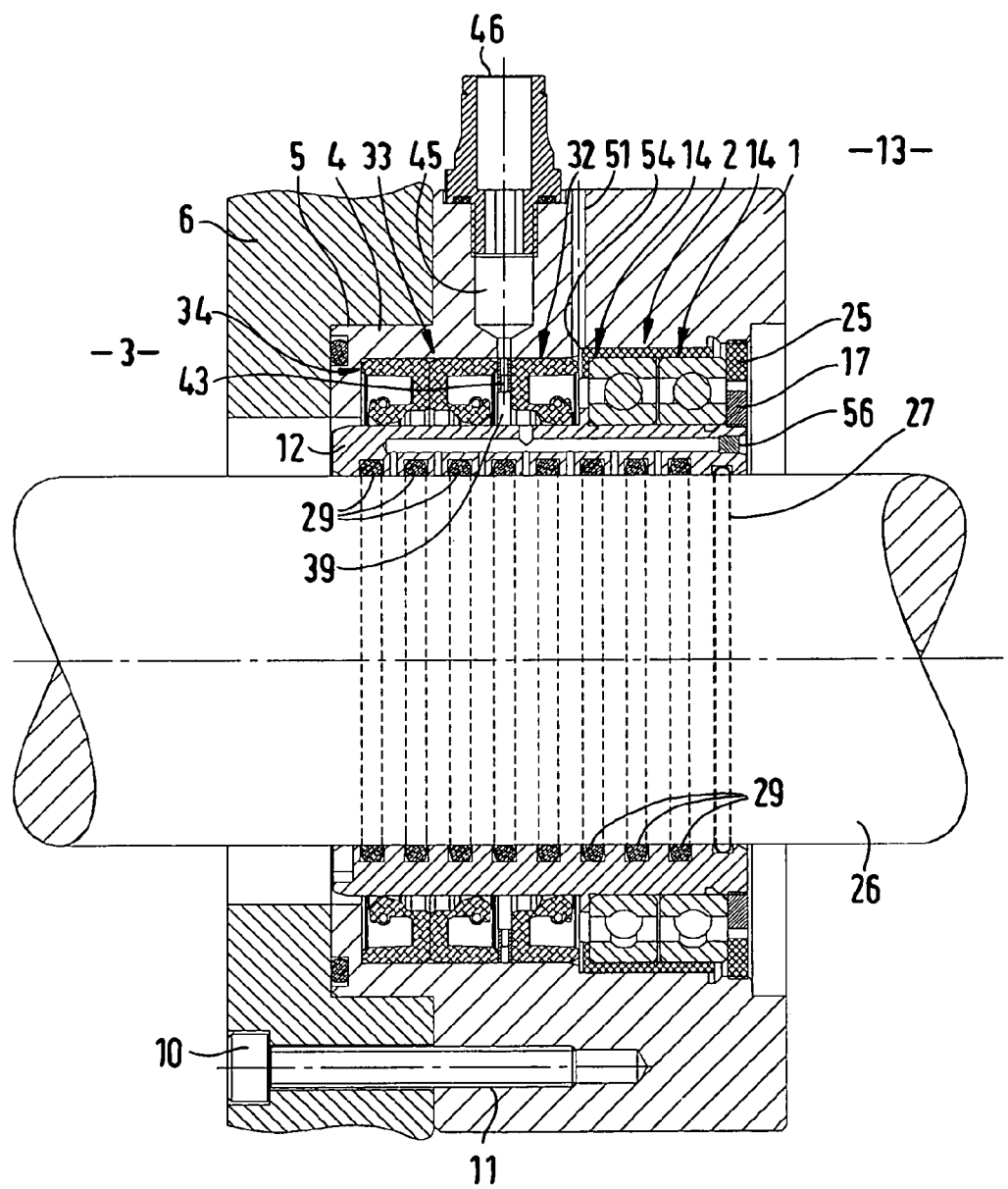
FIG. 2 shows a section through the shaft sealing module along the section line II—II in FIG. 1 with shaft.
Figure 3:
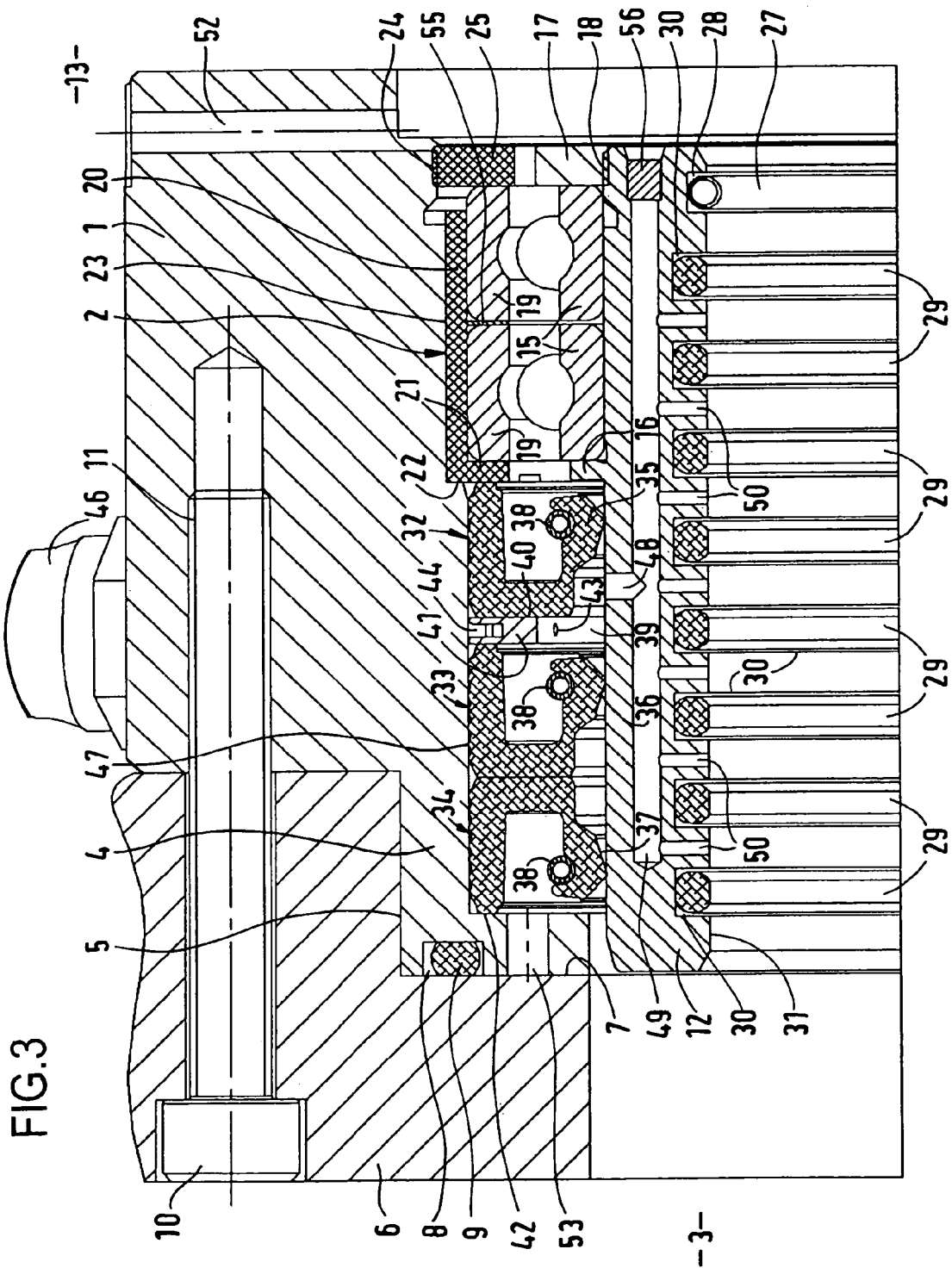
FIG. 3 shows the section broken away in enlarged scale through the shaft sealing module according the section line III—III in FIG. 1 without shaft.

As shown in FIGS. 2 and 3, the shaft sealing module has a housing 1, the outer periphery of which is formed essentially cylindrical. In the housing 1 and throughout its entire axial length is provided a stepped bore 2 concentric with the cylindrical outer periphery, which bore holds the remaining the parts of the shaft sealing module in a manner to be described. The housing 1, on its side facing the high vacuum chamber 3, has a cylindrical mounting collar 4 which is concentric with the stepped bore 2 and held suitably in a corresponding hollow cylindrical recess 5 in the wall 6 enclosing or delimiting the high vacuum chamber 3. The mounting collar 4 terminates in a flat face 7 in which is formed a receiving groove 8 for a sealing ring 9 which ensures a static seal against the wall 6 when the shaft sealing module is mounted on the wall 6. The shaft sealing module is mounted by several screws 10 which extend through the wall 6 and are screwed into corresponding threaded bores 11 of the housing 1.

Within the housing 1 is rotatably mounted an essentially hollow cylindrical bushing 12, For this are provided two roller bearings 14 arranged adjacent to the normal pressure chamber 13, in the example shown deep groove ball bearings. Firstly the one inner roller bearing ring 15 of the roller bearing 14 rests on a ring shoulder 16 of the bushing 12 while secondly the other outermost inner roller bearing ring 15 lies on a ring nut 17 screwed onto an external thread 18 of the bushing 12.

The outer roller bearing rings 19 sit in an insulating bushing 20 of electrically non-conductive material of sufficient strength. The insulating bushing 20 has an inwardly directed ring flange 21 on which rest the two outer roller bearing rings 19. Between the two outer roller bearing rings 19 is an intermediate ring 55, as is shown most clearly in FIG. 3. The insulating bushing 20 for its part rests axially on a ring step 22 of the stepped bore 2. Radially the insulating bushing 20 rests on a medium diameter section 23 of the stepped bore 2. Screwed onto an internal thread 24 of the stepped bore 2 is a threaded ring 25 of electrically insulating material of adequate strength, which lies on the outermost outer roller bearing ring 19. In this way the bushing 12 and the shaft 26, passed through the bushing 12 in a manner to be described, are electrically isolated from the housing 1. The bushing 12 is connected electrically conductively with the shaft 26 via a metal spring washer 27 which sits in a receiving groove 28 of the bushing 12.

The bushing 12 is held in friction connection statically sealed on the shaft 26 by a multiplicity of elastic rings 29, in the embodiment example shown eight O-rings. The elastic rings 29 are laid in ring grooves 30 in the inner wall surface 31 of the bushing 12.

The bushing 12 is sealed against the housing 1 by several radial shaft sealing rings 32, 33 and 34. These radial shaft sealing rings are of known design and have sealing lips 35 or 36 or 37 which are pressed by coil tension springs 38 against the bushing 12. The embodiment example has three radial sealing rings 32, 33 and 34, where between them in a manner to be described in more detail below is provided a prevacuum chamber 39 with intermediate evacuation for a two-stage dynamic seal between the bushing 12 and the housing 1.

As is shown most clearly from FIG. 3, the radial shaft sealing rings 32, 33 and 34 are arranged so that the radial shaft sealing ring 32 adjacent to the roller bearings 14 faces the normal pressure chamber 13 with its sealing lip 39 and with its rear surface 40 rests on a spacer ring 41. This spacer ring 41 inserted between the radial shaft sealing rings 32 and 33 forms the prevacuum chamber 39. The two other radial shaft sealing rings 33 and 34 are adjacent to the high vacuum chamber 3 and lie with their rear faces on each other. Thus they rest firstly, namely with the radial shaft sealing ring 33, on the spacer ring 41 and secondly, namely with the radial shaft sealing ring 34, on a ring step 42 of the stepped bore 2. With their outer peripheral surfaces the radial shaft sealing rings 32, 33 and 34 rest on a section 47 of the stepped bore 2 of which the diameter is smaller than that of the medium diameter section 23.

In the spacer ring 41 are provided radial bores 43 which starting from a peripheral groove 44 of the spacer ring 41 connect the prevacuum chamber 39 with a vacuum connector 46 inserted sealed in a housing bore 45. The prevacuum chamber 39 is limited by the spacer ring 41 and the two adjacent radial shaft seals 32 and 33 and is connected via a channel 48 in the wall of the bushing 12 with a collection channel 49 which is also located in the wall of the bushing 12. The collection channel 49 is formed by a blind bore which runs parallel to the bushing axis and is closed tightly after its creation in the bushing wall e.g. by a spot weld or by a sealing stopper 56.

The collection channel 49 is connected via radial channels 50 with the chambers between the elastic rings 29 so that a prevacuum applied via the vacuum connectors 46 is effective up to the cavities between the elastic rings 29. These cavities are narrow gaps which are each limited laterally by two elastic rings 29 and by axial peripheral sections of the inner wall surface 31 of the bushing 12 and the outer periphery of the shaft 26.

The operating manner of the shaft sealing module tightly mounted on the wall 6 is described in more detail below.

The shaft 26 which in most applications is driven at low rotation speed, for example 20 rpm, carries the bushing 12 rotationally and slip-free via the friction connection described. Via the vacuum connectors 46 is applied a prevacuum, usually generated by a split ring pump, the quality of which is lower than the vacuum generated by the turbomolecular pump in the high vacuum chamber 3. Under the effect of the prevacuum the sealing lip 35 of the first radial shaft sealing ring 32, which is exposed to atmospheric pressure, lies tightly on the bushing rotating with the shaft. At the same time the prevacuum acts on the cavities between the elastic rings 29 and forms a gas barrier for gases penetrating from the outside from the normal pressure chamber 13 via the static seal.

The two other radial shaft sealing rings 33 and 34 act in two ways. On operation with prevacuum, the sealing lip 36 of the second radial shaft sealing ring 33 lies tightly on the bushing 12 because of the pressure difference between the prevacuum in the prevacuum chamber 39 and the high vacuum predominating behind the radial shaft sealing ring 33. The sealing lip 37 of the third shaft sealing ring 34, exposed to the high vacuum on both sides, is pressed by the allocated coil tension spring 38 against the bushing 12. If the prevacuum is broken, atmospheric pressure is present in front of the second radial shaft sealing ring 33 and its sealing lip 36 presses tightly on the bushing 12 under the effect of the great pressure difference between atmospheric pressure and high vacuum, thus blocking with the same intensity as in operation with prevacuum. Here too the sealing lip 37 of the last radial shaft sealing ring 34 is pressed against the bushing 12 by the associated coil tension spring 38. In this way the shaft sealing module according to the invention has a safety reserve.

Further module units, e.g. for targeted introduction of process gases or cooling fluids, can be mounted with the same function principle on the shaft 26 and connected in succession, statically sealed, with the shaft sealing module.

As FIG. 2 shows, in the housing 1 close to the vacuum connector 46 is arranged a first radially directed atmosphere bore 51 which, via a radially arranged degasification groove 54 in the insulation bushing 20, connects the normal pressure chamber 13 surrounding the shaft sealing module with the stepped bore 2 of the housing 1 in front of the first radial shaft sealing ring 34 adjacent to the roller bearings 14, as shown in FIG. 2. FIG. 3 shows a second atmosphere bore 52 which is also arranged radially directed in housing 1. The atmosphere bore 52 is provided on the outside in front of the roller bearings 14 and ensures that normal pressure is also present in front of the outer elastic ring 29 between the bushing 12 and the shaft 26, in particular if a further module unit (not shown) is connected statically sealed on the shaft sealing module.

For a leakage seal test of the shaft sealing module, helium can be supplied through the atmosphere bores 51 and 52. The leakage rate, i.e. the quantity of helium emerging through the shaft sealing module, can be revealed by means of a helium detector (not shown) which is or can be connected with the high vacuum chamber 3. The leakage rates achievable with the shaft sealing module according to the invention are extremely low. Leakage rates have been found of just $$Q < 10^{-6} \text{mbar} \frac{l}{s}$$

Figure 1:
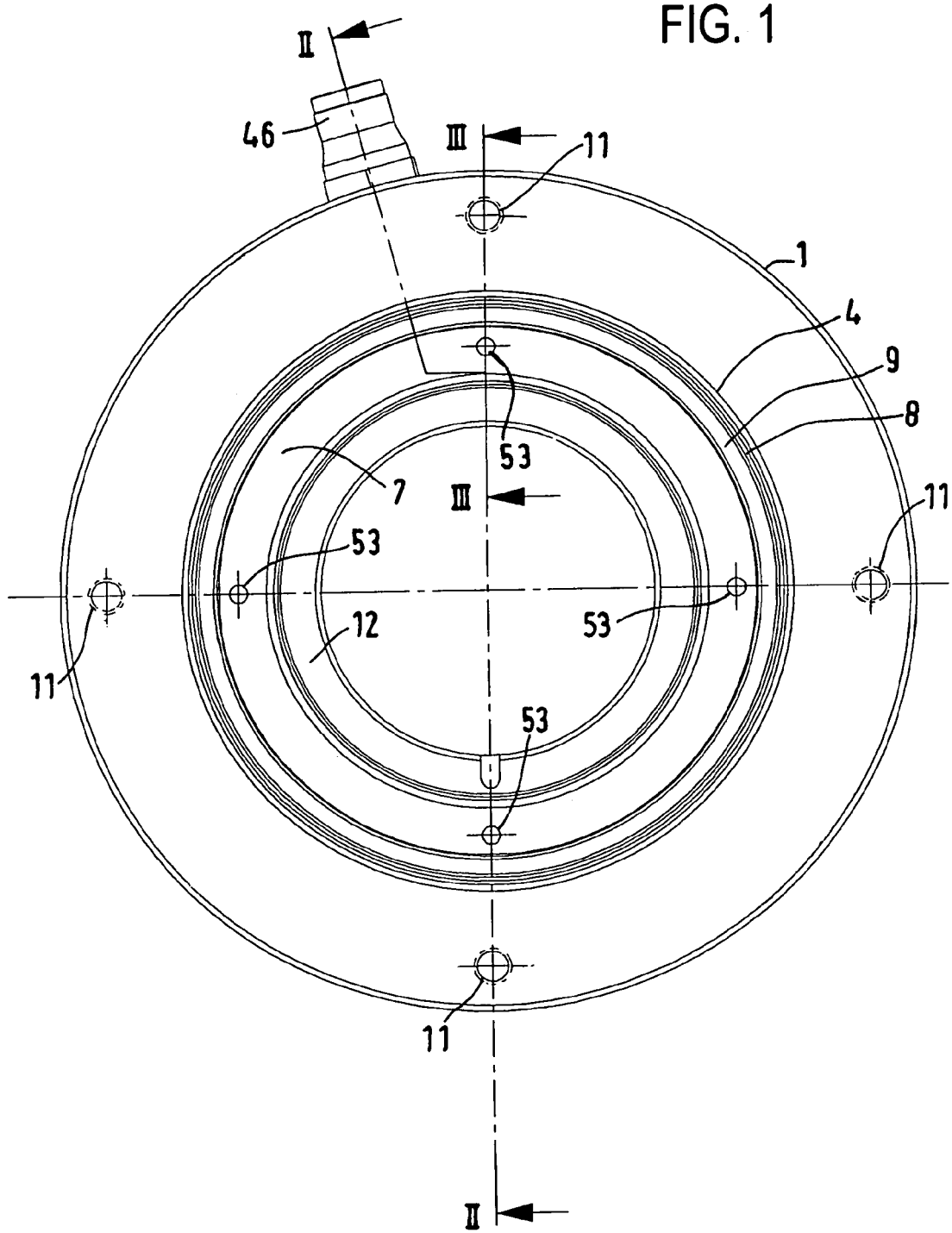
FIG. 1 shows an axial view of the shaft sealing module from the high vacuum side and without the shaft.

As is clear from FIGS. 1 and 3, in the housing 1 can be provided several dismantling bores 53 axially parallel to the stepped bore 2. For example four dismantling bores may be evenly distributed around the periphery with the same angular intervals, of which only one is shown in FIG. 3. The radial shaft sealing rings 32 to 34 can be removed from the stepped bore 2 through the assembly bores 53 using suitable tools (not shown).

A shaft sealing module is proposed for sealing a shaft which extends, driving rotationally, from a normal pressure chamber into a high vacuum chamber. It is essential for the shaft sealing module according to the invention that the dynamic shaft seal takes place not on the shaft itself but on a bushing mounted rotatably in a housing, through which bushing the shaft is guided and which is held on the shaft in friction connection, statically sealed, by elastic rings so that the bushing rotates with the shaft. The dynamic seal between the bushing and housing is achieved by several radial shaft sealing rings which are preferably arranged so that between them is provided a prevacuum chamber with intermediate evacuation so that a two-stage dynamic seal is present, where the prevacuum also acts on the static seal between the bushing and shaft in the sense of a gas penetration barrier towards the high vacuum chamber.

The invention claimed is:

1. A shaft sealing module for sealing a shaft which extends driving rotationally from a normal pressure chamber into a high vacuum chamber, comprising:
    a bushing rotatably mounted within a housing through which the shaft can be passed concentrically, the bushing being held in friction connection statcally sealed on the shaft by a multiplicity of elastic rings and being dynamically sealed against the housing by radial shaft sealing rings with elastomer sealing lips pressed by coil tension springs on the bushing;
    wherein the bushing is mounted rotatably in the housing via roller bearings, comprising inner and outer roller bearings, arranged adjacent to the normal pressure chamber; and
    wherein three radial shaft sealing rings are provided, of which one radial shaft sealing ring is adjacent to the roller bearings and has a sealing lip which faces the normal pressure chamber and has a rear face which rests on a spacer ring forming a prevacuum chamber, while the other two radial sealing rings are adjacent to the high vacuum chamber, have rear faces and lie against each other with their rear faces and rest firstly on the spacer ring and secondly on a ring step of a stepped bore of the housing holding the radial shaft sealing rings and the roller bearings.

2. A shaft sealing module according to claim 1, wherein radial bares are provided in the spacer ring which connect the prevacuum chamber with a vacuum connector tightly inserted in a housing bore.

3. A shaft sealing module according to claim 1, wherein the inner roller bearing rings rest firstly on a ring shoulder of the bushing and secondly on a ring nut which can be screwed onto an external thread of the bushing.

4. A shaft sealing module according to claim 1, wherein the outer roller bearing rings with their insulating bushing rest firstly on a further ring step of the stepped bore of the housing and secondly on a threaded ring of electrically insulating material which can be screwed into an internal thread of the stepped bore.

5. A shaft sealing module according to claim 1, wherein the housing on its side facing the high vacuum chamber has a cylindrical mounting collar concentric with the stepped bore and terminating in a flat face in which is located a receiving groove for a sealing ring to ensure a static seal against a wall delimiting the high vacuum chamber.

6. A shaft sealing module according to claim 1, wherein the housing includes a first atmosphere bore which connects the normal pressure chamber with the stepped bore of the housing in front of the radial shaft sealing ring adjacent to the roller bearings via a degasification groove in the insulating bushing.

7. A shaft sealing module according to claim 6, wherein the housing includes a second atmosphere bore which ensures that normal pressure is present in front of the outer elastic ring between the bushing and the shaft.

8. A shaft sealing module according to claim 6, wherein the housing includes a plurality of disassembly bores which are axially parallel to the stepped bore and evenly distributed over the periphery, through which the radial shaft sealing rings can be pushed out from the stepped bore.

9. A shaft sealing module for sealing a shaft which extends driving rotationally from a normal pressure chamber into a high vacuum chamber, comprising:

a bushing rotatably mounted within a housing through which the shaft can be passed concentrically, the bushing being held in friction connection statically sealed on the shaft by a multiplicity of elastic rings and being dynamically sealed against the housing by radial shaft sealing rings with elastomer sealing lips pressed by coil tension springs on the bushing a two-stage dynamic seal by means of a prevacuum chamber with intermediate evacuation arranged between at least two of said radial shaft sealing rings;

wherein the prevacuum chamber is connected with the cavities between the elastic rings by channels accommodated in the bushing; and A shaft wherein the bushing includes a wall defining a collection channel, axially parallel and closed on both sides, which extends over all of the elastic rings and is connected via radial channels with the cavities between the elastic rings and via a further channel with the prevacuum chamber.

* * * * *